No. 701,600. Patented June 3, 1902.
J. D. McCRIMMON.
HAND HOE.
(Application filed Oct. 9, 1901.)
(No Model.)
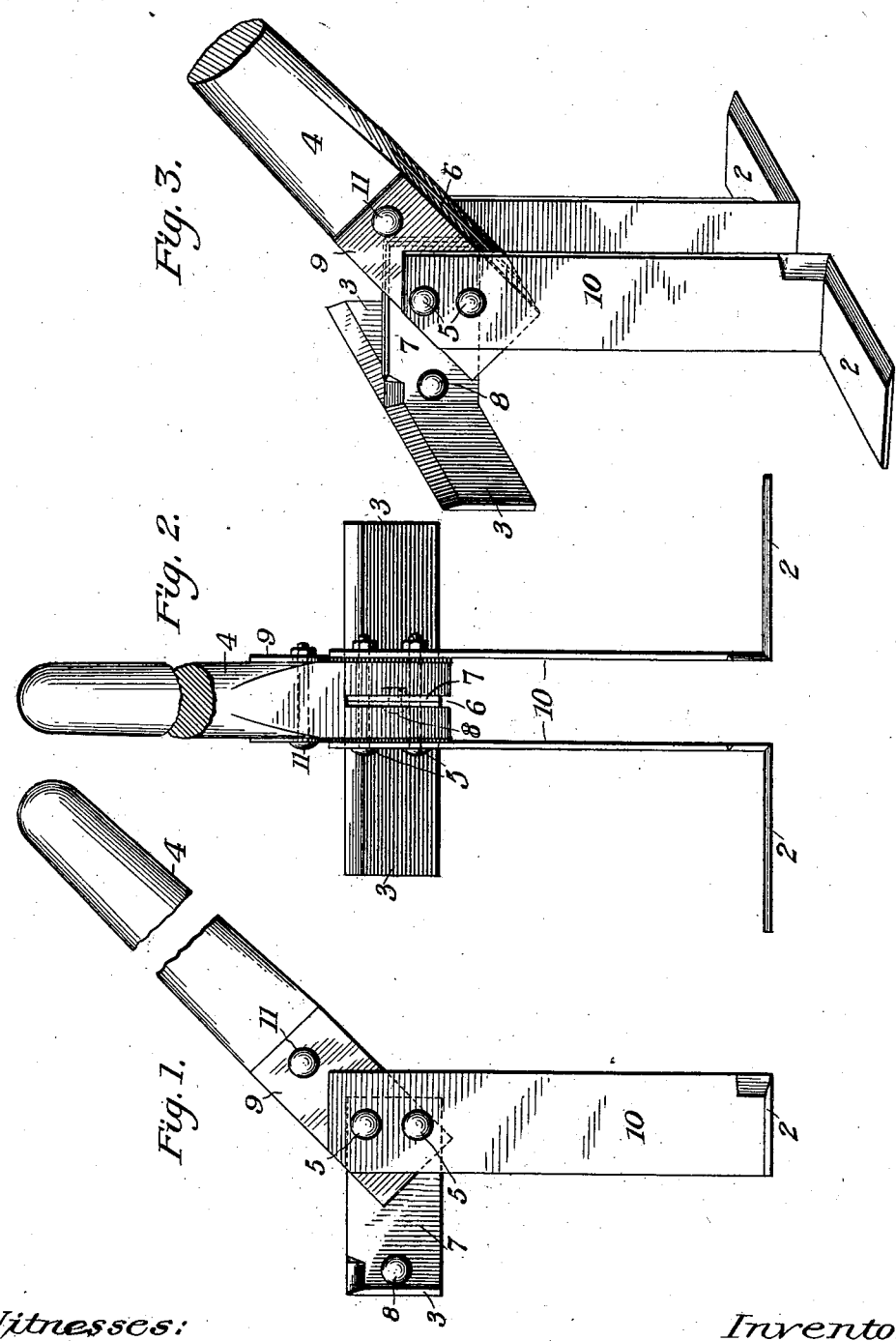
Witnesses:
Alex Scott
R A Balderson
Inventor:
John D. McCrimmon
By Edwin S. Hoskins,
Atty.

UNITED STATES PATENT OFFICE.

JOHN D. McCRIMMON, OF ST. LOUIS, MICHIGAN.

HAND-HOE.

SPECIFICATION forming part of Letters Patent No. 701,600, dated June 3, 1902.

Application filed October 9, 1901. Serial No. 78,137. (No model.)

*To all whom it may concern:*

Be it known that I, JOHN D. McCRIMMON, a resident of St. Louis, in the county of Gratiot and State of Michigan, have invented a new and useful Improvement in Hand-Hoes, intended more especially for blocking and thinning sugar-beets and other plants when small, of which the following is a specification.

The object of my improvement is to enable the user to block and thin out sugar-beets and plants when small, so as to leave but few plants to be thinned by hand, completely killing all weeds when cut about one-half an inch under the surface and doing the work rapidly and easily.

In the accompanying drawings, Figure 1 represents a side elevation with the handle broken. Fig. 2 represents a rear elevation, and Fig. 3 shows a perspective view, of the hand-hoe.

The hoe-wings 2 and blades 3 being made of steel are light, the hoe weighing but three to three and one-half pounds, including handle 4. The wings 2 and blades 3 are sharpened with a bevel on the upper side and may be used in any desired length from two to twelve inches, as after the sugar-beets or plants begin to grow a shorter blade is required to clean between the beets or plants in the row.
The blades 3 and wings 2 are fastened to the end of the handle 4 by means of two small bolts 5.

The handle 4 is five feet long, with a square end with a slot 6 in its center, in which are fastened the standards 7, supporting the blades 3. These standards are held together by a small bolt 8. A clasp 9 is fitted on each side of the handle to keep the bolts from wearing the wood and getting loose. The standards 10 are fitted on the surface of the clasps and held in place by two bolts 5. Another bolt 11 completes the clasp's fastenings.

Having fully described my invention, what I claim, and desire to secure by Letters Patent, is—

The combination of a pair of horizontal flat blades, each standing substantially at a right angle to a supporting-standard, said standards attached to a handle, and a second pair of standards attached to the same handle substantially at a right angle to the first pair of standards, and each standard supporting a vertical blade at a substantially right angle to it.

In testimony whereof I have hereto set my hand and affixed my seal, this 8th day of August, 1901, in the presence of two subscribing witnesses.

JOHN D. McCRIMMON. [L. S.]

Witnesses:
EDNA GRAHAM,
ROSS F. MILLER.